Aug. 5, 1952 M. RIVES 2,605,521
VENTILATED METAL AWNING
Filed Oct. 3, 1947 2 SHEETS—SHEET 1
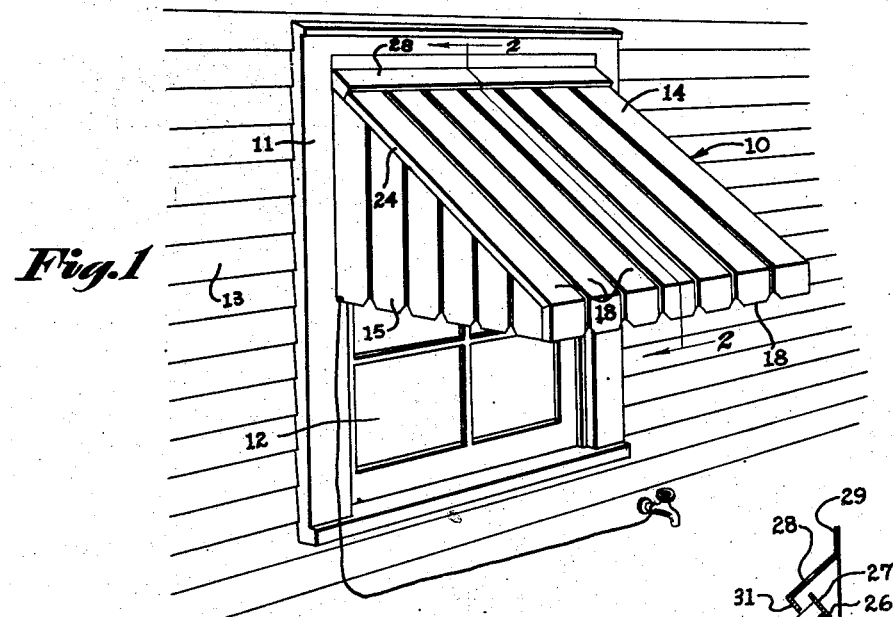
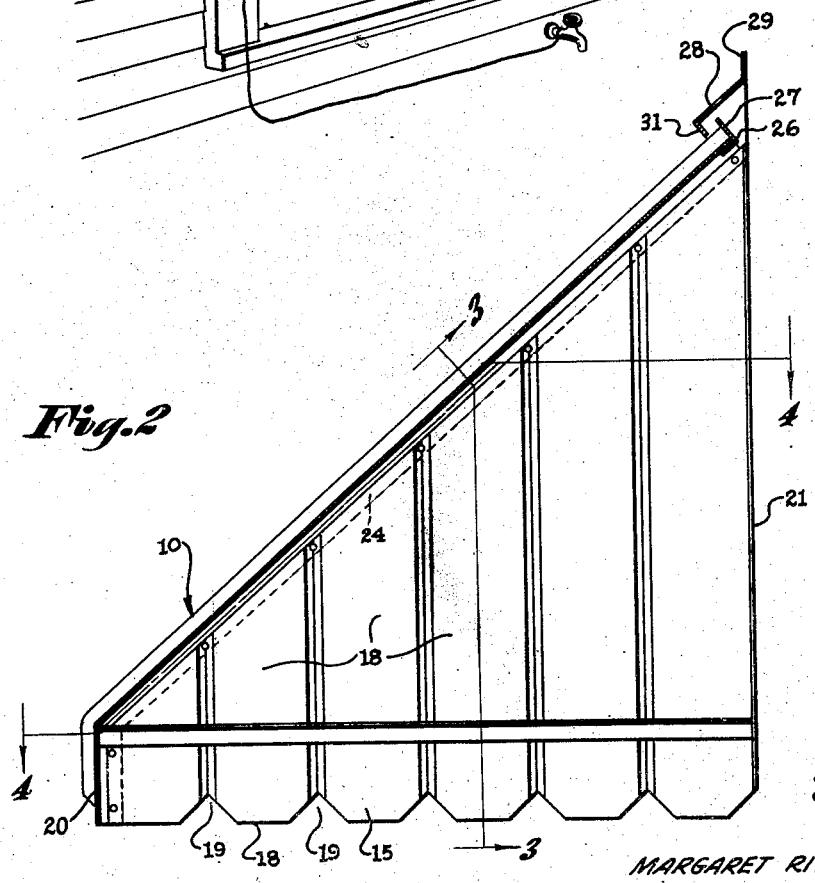
Inventor
MARGARET RIVES
By Mason, Fenwick & Lawrence
Attorneys Aug. 5, 1952 — M. RIVES — 2,605,521
VENTILATED METAL AWNING
Filed Oct. 3, 1947 — 2 SHEETS—SHEET 2

INVENTOR
MARGARET RIVES

Patented Aug. 5, 1952

2,605,521

UNITED STATES PATENT OFFICE 2,605,521

VENTILATED METAL AWNING

Margaret Rives, Jacksonville, Fla.

Application October 3, 1947, Serial No. 777,613

2 Claims. (Cl. 20—57.5)

The present invention relates in general to window awnings, and more particularly to sheet metal window awnings constructed to provide ventilation of the awning structure.

Awning structures removably mounted to structural window frames so as to substantially extend over and surround the upper portion of the window frame and shield the window from sunlight incident to the window, and from rain and weather, have heretofore been constructed of various materials, such as fabric mounted on suitable collapsible frames, wood, fibres, and sheet metal, the sheet metal awnings being particularly desirable because of the adaptability of such material to economical mass production methods. Due, however, to the radiant heat absorptive qualities of metals, constant exposure of sheet metal to direct sunlight, as in the present application as window awnings, produces a large amount of heat adjacent the surfaces of the sheet metal in the absence of ventilation, rendering this material undesirable for such applications, as their period of principal utility occurs during the warm summer seasons, where the function of such awning structures is not only to shield direct sunlight from the window with which the awning is associated, but to thereby effect some cooling of the adjacent area near the window and the interior of the structure in which the window is disposed.

Accordingly, an object of the present invention is the provision of a novel ventilated metal awning capable of preventing the admission of water or sunlight therethrough, but effecting circulation of air about the interior and exterior surfaces of the awning.

Another object of the present invention is the provision of a novel ventilated sheet metal window awning capable of shielding the window with which it is associated from sunlight and rain water, while effecting substantially continuous air ventilation of the interior and exterior surfaces of the awning structure.

Another object of the present invention is the provision of a novel ventilated sheet metal window awning characterized by simplicity and economy of construction and operation which is readily adaptable to mass production manufacturing methods, which is opaque to incident sunlight and rain water, and capable of effecting substantially continuous air ventilation of the interior and exterior surfaces of the awning.

Other objects, advantages, and capabilities of the invention will become apparent from the following description of the invention, taken in conjunction with the accompanying drawings, showing only a preferred embodiment of the invention, in which:

Figure 1 is a perspective view of the ventilated metal awning embodying the present invention, shown as mounted over an exterior window of a house;

Figure 2 is a vertical longitudinal section view of the metal awning, showing the interior thereof, taken along the lines 2—2 of Figure 1;

Figure 3:
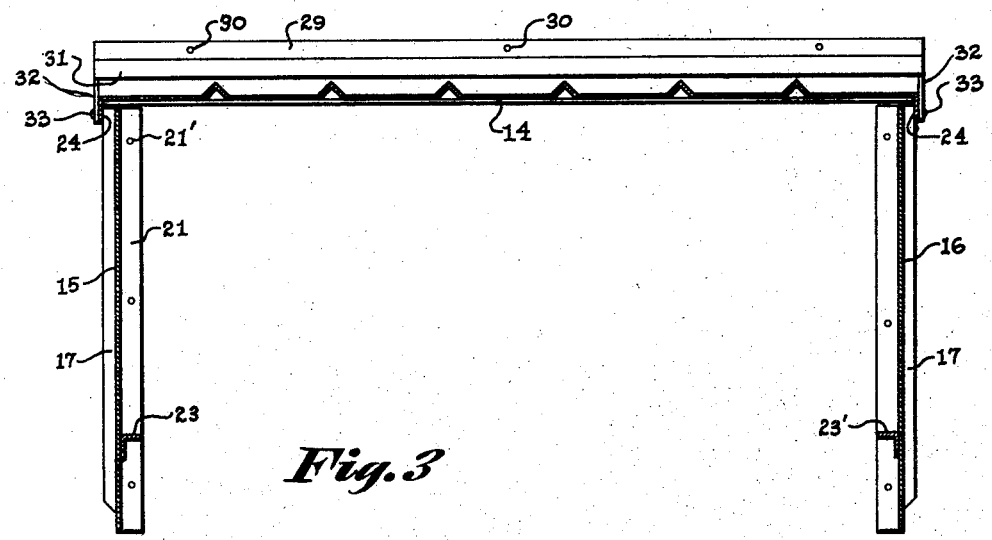
Figure 3 is a vertical transverse section view of the metal awning, taken along the lines 3—3 of Figure 2; and, Figure 4 is a horizontal section view of the metal awning, taken along the lines 4—4 of Figure 2.
Figure 4:
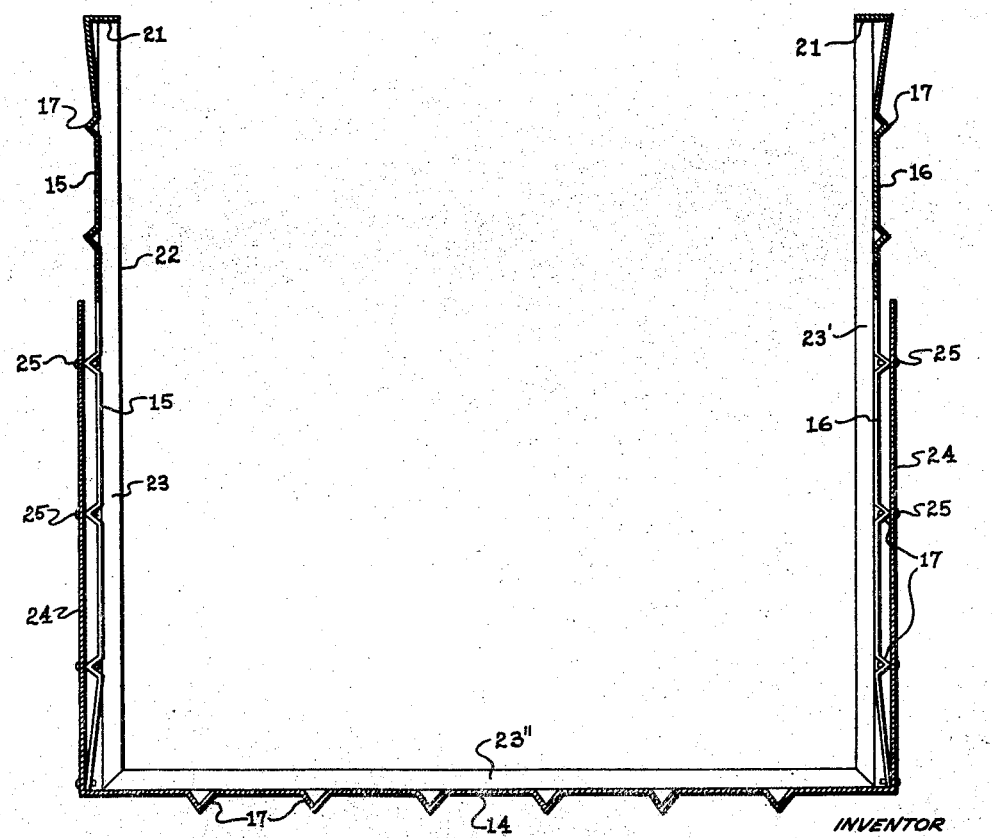

Referring to the several figures of the drawings, in which like reference characters designate corresponding parts throughout, the metal awning embodying the present invention, indicated generally at 10, is adapted to be removably secured to the sill or frame 11 of an exterior window 12 along the top and the upper portions of the sides thereof, extending outwardly from the wall surface 13 in which the window is disposed a sufficient distance to shield the window from direct sunlight over the prevailing range of angles of incidence of the sun's rays. The awning 10 consists of a top 14 and sides 15 and 16 extending downwardly beneath the top 14, both the top 14 and sides 15 and 16 being constructed of sheet metal formed with longitudinally extending ridges or inverted V-shaped ribs 17 to guide rainwater downwardly along the surfaces of the awning in the valleys 18 formed between the ridges or ribs 17. The lower edges 18 of the top 14 and sides 15 and 16 are provided with substantially V-shaped cut outs 19 aligned with the ridges 17 to give a scalloped border to the awning for ornamental purposes as well as facilitate the conduction of rain water down the surface of the awning 10 and off of the awning at the lower edges thereof.

The sides 15 and 16 of the awning 10 are shaped to define a substantially right triangle, the hypotenuse or outer edge of which forms a downwardly sloping support for the top 14 of the awning, the outer edge, or hypotenuse, breaking abruptly downwardly vertically to define a vertical front 20 for the awning 10. The inwardly disposed edge of the sides 15 and 16, the vertically disposed adjacent side of the right triangle formed thereby, is shaped to provide a flange 21 extending perpendicularly to the sides 15 and 16 provided with spaced openings 21' therethrough for mounting screws for securing the sides 15 and 16 to the window frame 11. A U-shaped supporting frame 22, the arms of which are formed of angle iron members secured at the corners of the frame 22 as by welding or brazing, is provided to lend strength and rigidity to the awning, the lateral arms 23, 23' being fixed to the inner surface of the sides 15 and 16 by suitable means a short distance above the lower edge of the sides and aligned with the point where the outer edge of the sides or the hypotenuse extends downwardly to form the front 20 of the awning and their outer ends intercoupled by a cross-arm 23.

The top 14 of the awning 10 is disposed over and spaced above the sides 15 and 16 overlying the outer edges or hypotenuse and the ridges 17 of the sides, the lateral edges of the top 14 being formed with downwardly depending flanges 24 having spaced openings extending therethrough to be aligned with openings in the upper ends of the ridges 17 on the sides 15 and 16 for receiving securing bolts 25 to form a rigid unitary structure, an opening being defined between the top surface 14 and the upper edges of the sides. The top 14 extends downwardly vertically from the break in the outer edges of the sides 15 and 16 where these edges extend downward vertically to form the front 20 of the awning, the top 14 being secured to the cross arm 23 of the U-shaped frame 22 immediately below this break by suitable fastening means.

Along the upper edge of the top 14 of the awning 10, an angle iron bar 26 is secured to the top 14 with one arm 27 of the angle iron bar 26 extending perpendicular to the outer surface of the top 14 beyond the apex of the ridges 17 thereon. A heading member 28, likewise constructed of sheet metal, having a flange 29 along the upper edge of the heading 28 with spaced holes 30 extending therethrough to receive mounting screws for securing the flange flush with the upper face of the window frame 11, is shaped to extend over the top 14 of the awning 10 substantially parallel therewith but spaced therefrom, the lower edge of the heading member 28 having a perpendicular flange 31 extending downward therefrom to engage the outwardly disposed apex of the ridges 17 on the top 14, this flange 31 being positioned toward the lower end of the awning from the bar 26 secured to the upper edge of the top 14, substantially as shown in Figure 2. The lateral ends of the heading member 28 are likewise provided with downwardly depending flanges or sides 32 shaped to overlie the lateral flanges 24 of the top 14 and be secured thereto by bolts 33. It will be noted that the ridges 17 serve as spacers to maintain the adjacent surfaces of the separate components of the awnings separated from each other wherever intercoupled.

Due to the spacing of the top 14 from the upper edges of the sides 15 and 16, the spacing of the lateral flanges 24 of the top 14 from the outer surface of the sides 15 and 16 by the ridges 17, and the open path defined between the flange 31 on the heading member 28 and the vertical flange 27 of the right angle bar 26, free circulation of air from underneath the awning 10 upward along the under surface of the top 14 through the opening between the heading member 28 and the top 14, and through the space between the sides 15 and 16 and the top 14 and flanges 24 of the top 14 is possible. Since the lower edge of the heading 28 and the outer edge of the flanges 24 on the top 14 overlie the top 14 and sides 15 and 16 respectively, water or sunlight incident to the awning 10 from above is prevented from entering the circulation openings and is directed downwardly by the ridges 17 and off the lower edges of the awning. Due to the radiant heating of the sheet metal composing the awning 10 on exposure to direct sunlight, the area adjacent and underneath the awning becomes heated substantially above the temperature of the air, the heated air under the awning rising along the under surface of the awning 10 and escaping through the openings defined at the edges thereof, producing a substantially constantly moving current of air through that path and effecting ventilation and cooling of the awning to aid in its cooling effectiveness.

A copper grounding conductor, indicated at 34, may be coupled from a point on the sheet metal awning 10 to any suitable grounding terminal, such as a water pipe or like grounded conductor, to provide lightning protection for the structure on which the awning 10 is mounted, the sheet metal of which the awning is constructed being highly attractive to lightning relative to the other material components of the structure.

It will be apparent from the above description that a novel metal awning has been provided of simple and economic construction, readily susceptable to mass production methods, and which provides more effective cooling of the area adjacent the awning by providing substantially constant circulation of air about the surfaces of the awning exposed to direct sunlight and openings for the escape of such air from under the awning at the boundaries thereof, while effectively shielding the area underneath the awning from direct sunlight or rain water.

While only one particular embodiment of the invention has been particularly shown and described, it is distinctly understood that the invention is not limited thereto, but that various modifications may be made in the invention without departing from the spirit and scope thereof, and it is desired, therefore, that only such limitations shall be placed thereon as are imposed by the prior art and are set forth in the appended claims.

I claim:

1. A sheet metal window awning comprising, a pair of side members of substantially right triangular shape having a plurality of spaced vertical inverted V-shaped ridges forming narrow guide ribs extending outwardly from said side members, adjacent sides of said triangular side members having flange means along the edge thereof extending at right angles to said side members adapted to be secured flush with the face of a window frame, a substantially rectangular top member extending between said side members disposed in a downwardly sloping plane parallel with and spaced slightly above the upper edges of said side members providing substantially continuous ventilating openings therebetween, said top member having vertically aligned inverted V-shaped ridges spaced from each other extending the length of said top member, downwardly depending flange means formed along the lateral edges of said top member overlying the upper portion of said ridges on said side members and secured thereto, the upper edge of said top member when secured to the ridges on said side members lying slightly spaced from the window frame to which the awning is to be secured, and a heading member adapted to be secured to the window frame and extend along the upper edge of said top member overlying and spaced above the apices of the ridges on said top member, said heading member having a downwardly depending flange along the lower edge thereof bearing on the apices of said ridges and said top member having a continuous upright baffle strip extending from the upper edge thereof to a point above the apices of said ridges but spaced below said heading member to shield the opening formed therebetween from direct sunlight and water while defining a substantially continuous ventilating opening extending the length of said heading member providing free exit for the circulation of air from beneath said awning.

2. In a sheet metal window awning, the combination recited in claim 1, wherein a U-shaped angle iron member is provided to position said top and side members, the lateral arms of the angle iron member being secured to the side members near the bottom thereof and disposed in a horizontal plane with their rearwardly disposed ends abutting the flange means on the side members and the cross piece of the angle iron member being rigidly secured to the top member near the lower end thereof to brace the top member transversely of the side members.

MARGARET RIVES.

REFERENCES CITED

The following references are of record in the file of this patent:

UNITED STATES PATENTS

| Number | Name | Date |
| --- | --- | --- |
| 1,757,111 | Crossley | May 6, 1930 |
| 2,256,941 | Crawford | Sept. 23, 1941 |
| 2,327,614 | Agee | Aug. 24, 1943 |
| 2,441,081 | Perry et al. | May 4, 1948 |